United States Patent
Lee

(10) Patent No.: US 11,010,733 B2
(45) Date of Patent: *May 18, 2021

(54) COMMUNICATION DEVICE INTERFACE FOR MONETARY TRANSFERS THROUGH A DISPLAYABLE CONTACT LIST

(71) Applicant: PAYPAL, INC., San Jose, CA (US)

(72) Inventor: Hyunju Lee, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 121 days.

This patent is subject to a terminal disclaimer.

(21) Appl. No.: 16/505,616

(22) Filed: Jul. 8, 2019

(65) Prior Publication Data

US 2019/0378099 A1   Dec. 12, 2019

Related U.S. Application Data

(62) Division of application No. 14/499,118, filed on Sep. 27, 2014, now Pat. No. 10,346,817.

(60) Provisional application No. 61/888,686, filed on Oct. 9, 2013.

(51) Int. Cl.
| | |
|---|---|
| *G06Q 20/10* | (2012.01) |
| *G06Q 20/32* | (2012.01) |
| *G06Q 20/36* | (2012.01) |
| *G06Q 20/38* | (2012.01) |
| *G06Q 50/00* | (2012.01) |

(52) U.S. Cl.
CPC .......... *G06Q 20/10* (2013.01); *G06Q 20/322* (2013.01); *G06Q 20/3278* (2013.01); *G06Q 20/363* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 2007/0208816 A1 | 9/2007 | Baldwin et al. | |
| 2013/0041811 A1 | 2/2013 | Vazquez et al. | |
| 2013/0282577 A1 | 10/2013 | Milne | |
| 2014/0279391 A1 | 9/2014 | Gallo et al. | |

*Primary Examiner* — Joseph W. King
(74) *Attorney, Agent, or Firm* — Haynes and Boone, LLP

(57) ABSTRACT

There is provided systems and method for a communication device interface for monetary transfers through a displayable contact list. A user may import contacts from a contact list application, a social networking service, a user account with a payment provider, and/or another contact source into a communication device, such as a mobile phone. The mobile phone may then execute a monetary transfer module that allows the user to transmit requests for monetary transfers with the contacts. When the user selects a contact in a contact list, the module may retrieve payment account information and initiate a monetary transfer with the selected contact. The monetary transfer may correspond to receiving money or sending money to the contact. Additionally, the user may communicate messages with the request as well as a monetary amount. In order to facilitate completion of the monetary transfer, a payment provider may be utilized.

19 Claims, 5 Drawing Sheets

COMMUNICATION DEVICE INTERFACE FOR MONETARY TRANSFERS THROUGH A DISPLAYABLE CONTACT LIST

CROSS REFERENCE TO RELATED APPLICATION

The present application is a divisional application of U.S. patent application Ser. No. 14/499,118 filed Sep. 27, 2014 which claims priority to U.S. Provisional Patent Application Ser. No. 61/888,686, filed Oct. 9, 2013, all of which are incorporated by reference in their entirety.

TECHNICAL FIELD

Examplary embodiments of the present application relate generally to a communication device interface for monetary transfers through a displayable contact list and more specifically to utilizing a display module of a communication device having an output display device in order to present a user with a contact list of stored contact in a memory component of the communication device so the user may select a contact an initiate a monetary transfer through the communication device's communication module.

BACKGROUND

Users may wish to participate in financial transactions with other users. For example, users may split a cost of a meal, transportation, or item that the two or more users wish to share. Often, however, this can cause difficulties if one or more of the users do not possess correct change and/or actual physical money at the time of the transactions. Additionally, in some cases, one or more of the user may not have sufficient funds to their name at the time of the transaction, and the other user(s) may feel uncomfortable loaning money and later asking for remittance for their share of the good(s) or service(s). If users do wish to split a monetary cost for some good(s) or service(s), the users may transfer money between financial accounts. However, this requires accessing a financial account online or in person at a financial institution and entering sufficient user information to complete the monetary transfer. Thus, a user may not engage in financial transactions with other users even when advantageous to them.

Figure 1:
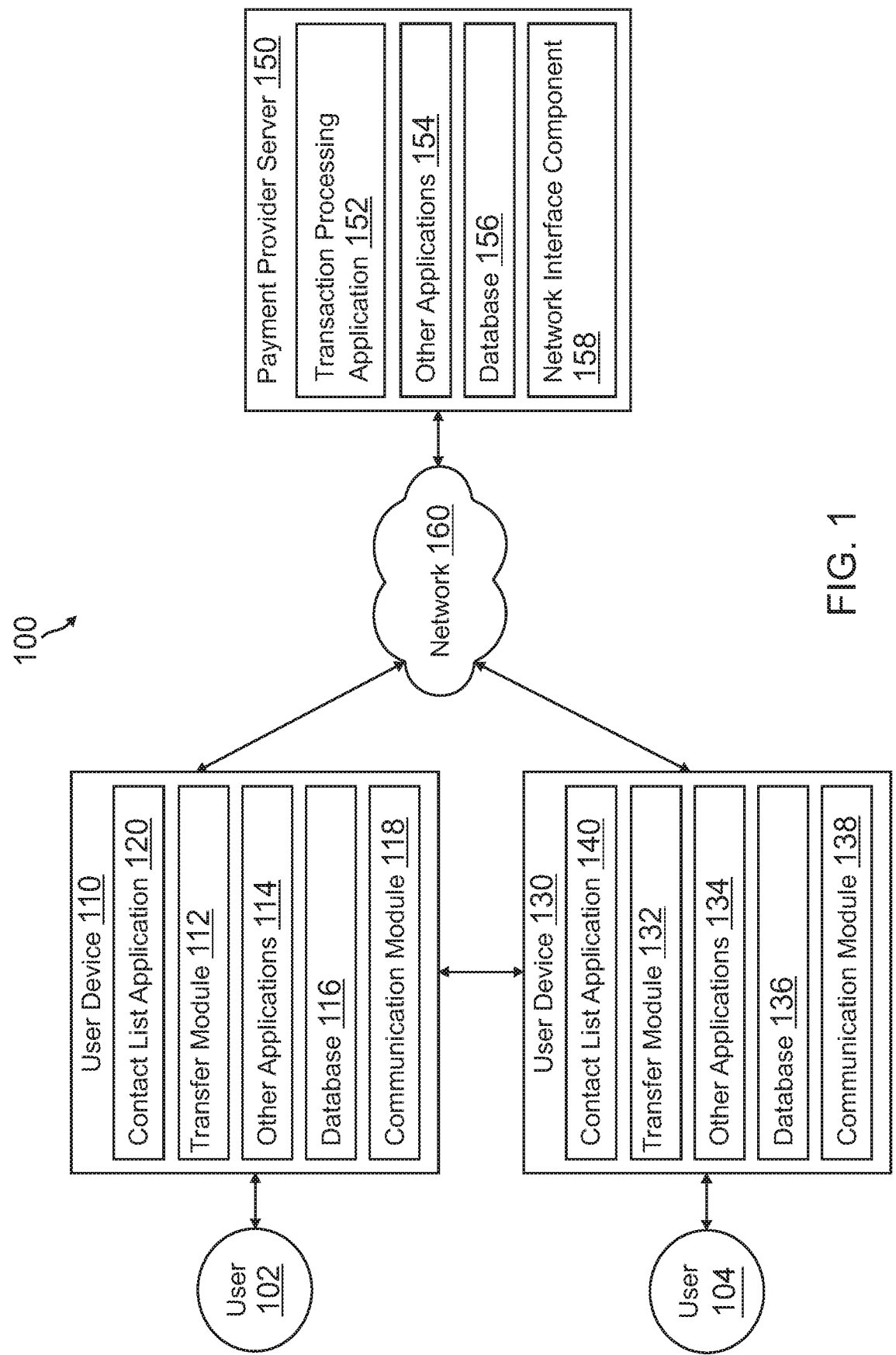
FIG. 1 is a block diagram of a networked system suitable for implementing the process described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for monetary transfers displaying a communication device interface for monetary transfers through a displayable contact list. Systems suitable for practicing methods of the present disclosure are also provided.

In various embodiments, a user may utilize a user device, such as a communication device, in order to engage in monetary transfer services with at least one other user. The communication device may include specialized hardware and/or software allowing the user to generate and transmit transfer requests with the other user. A non-transitory memory of a communication device may store contacts for a user of the communication device. For example contact information for a plurality of users may include a contact list of the users having their personal information, contact addresses (e.g., phone number, email address, payment account information, social networking address/name, or other contact address), and other associated information. The contact information may come from a contact book of the communication device, for example, a contact list application (e.g., an address book) that may store the contact information. The contact information may also come from one or more of an email contact list, a phone number contact list, a text message contact list, an instant messaging contact list, a social networking contact list, and a media sharing contact list. For example, email contacts may be stored by an email application when the user inputs the email contacts using an input device of the communication device or when the user receives emails from email contacts through a communication module of the communication device. In further embodiments, a social networking application executing on the communication device may include social networking contacts, which may be established and/or received by the social networking application utilizing a communication module of the communication device.

The communication device may include a monetary transfer module that may include applications and associated hardware that may interface with an application programming interface (API) of the contact list application in order to provide for monetary transfers through an application interface of the contact list application. The monetary transfer module may therefore allow for selection of a contact in the contact list application in order to initiate generation and transmission of a transfer request. For example, the monetary transfer may create a notification or icon displayable in the contact list application interface that the user may view through an output display device of the communication device that alerts the user that the contact may engage in transfer requests. Thus, the contact list application interface may present the contact information as a selectable list of users that may receive monetary transfer requests.

The contact information in the contact list may be utilized to initiate and complete monetary transfers. A first user of the communication device may view the contact information in a display module of an output device of the communication device and may select a second user listed to initiate a monetary transfer. Selection of the second user to initiate a monetary transfer may cause the display module to display a transfer request form. The transfer request form may include a field identifying the request as coming from the first user, a field designating the request as being sent to the second user, an amount for the request (including whether the request is a request to receive money from the second user or to send money to the second user), and a message field where the first user may utilize an input device of the communication device to enter an optional message to the second user. For example, the first user may wish to request payment for a portion of a dinner bill the first user covered, or may intend to pay the second user for a portion of the dinner bill the second user covered, and include a message corresponding to the dinner. Once the first user has completed the transfer request form, the first user may communicate the transfer request form to one or more of the second user and a payment provider offering monetary transfer services to the first user and the second user.

The monetary transfer module may utilize the communication module of the communication device to transmit the transfer request. The monetary transfer module may include payment account information for the first user in the transfer request so that the receiving entity (i.e., the second user or the payment provider) that enables the receiving entity to identify a payment account for the first user that may send or receive payments with the second user. The payment account may include a financial account with a financial institution, a standing payment account with the payment provider, a payment card, or other type of financial asset. The second user may then view the transfer request through one or more of a payment application and/or a contact list application utilizing features offered by a similar monetary transfer module to the one described above.

The monetary transfer module may also determine and generate icons, notifications, or other displayable information for a verification status and/or credit history/rating for users in the contact list of the contact list application. For example, the second user may be verified with the payment provider so that the second user can send increased limits, has credit protection, or other heightened status with the payment provider. The monetary transfer module may receive and/or request information for the verification status using the communication module of the communication device, and may cause the contact list application interface to display such information next to the second user's contact information. Such information may also include a credit rating or history determined using one or more of the payment provider, past transactions with the second user, a financial institution, and/or a credit bureau. If the first user has previously had transfer interactions with the second user, financial/payment account information may be stored by the monetary transfer module with the contact information in the non-transitory memory of the communication device. Thus, the contact information may include a name, email address, or other identifying information necessary to identify a user account with a payment provider, or may include a checking account number, routing number, or other financial account number to complete the transfer with a financial institution.

FIG. 1 is a block diagram of a networked system 100 suitable for implementing the process described herein according to an embodiment. As shown, system 100 may comprise or implement a plurality of devices, servers, and/or software components that operate to perform various methodologies in accordance with the described embodiments. Exemplary device and servers may include device, standalone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user 104, a user device 110, a user device 130, and a payment provider server 150 in communication over a network 160. User 102 may utilize user device 110 to engage in monetary transfers with user 104 through user device 130. User 102 and user 104 may utilize payment provider server 150 to complete the monetary transfers between the two users.

User device 110, user device 130, and payment provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

User device 110 and user device 130 may be implemented using any appropriate hardware and software configured for wired and/or wireless communication between user device 110, user device 130, and/or payment provider server 150. For example, in one embodiment, user device 110/120 may be implemented as a personal computer (PC), a smart phone, laptop/tablet computer, wristwatch with appropriate computer hardware resources, eyeglasses with appropriate computer hardware (e.g. GOGGLE GLASS®), other type of wearable computing device, and/or other types of computing devices capable of transmitting and/or receiving data, such as an IPAD® from APPLE®. Although user devices are shown, the user devices may be managed or controlled by any suitable processing device. Although only two user devices are shown interacting, one or a plurality of user devices may function similarly.

User device 110 and user device 130 may correspond to separate iterations of a similar user device utilized to engage in monetary transfers between user 102 and user 104. For simplicity, the components of user device 110 and user device 130 are discussed together with respect to FIG. 1. However it is understood that implementations of user device 110 and user device 130 may include the same, similar, and/or different components in various embodiments.

User device 110 and user device 130 of FIG. 1 contain a contact list application 120 and a contact list application 140, a transfer module 112 and a transfer module 132, other applications 114 and other applications 134, a database 116 and a database 136, and a communication module 118 and a communication module 138, respectively. Contact list application 120/140, transfer module 112/132, and other applications 114/134 may correspond to processes, procedures, and/or applications, for example, a software program, executable by a hardware processor. In other embodiments, user device 110/120 may include additional or different software as required.

Contact list application 120/140 may correspond to an application storing contact information for one or more contacts of user 102/104. For example, contact list application 120 may include contact information for user 104/user device 130, while contact list application 140 may include contact information for user 102/user device 110. Thus, contact list application 120/140 provides an interface to store, view, and utilize to transmit correspondence to user 102/104. Such application interface may be presentable to user 102/104 through an output device of user device 110/130, such as a display module. Contact list application 120/140 may store contact information to a non-transitory memory of user device 110/130 in the form of names, address, phone number, email address, user account names, or other information. The contact information may be sufficient to allow user 102 to generate and communicate a transfer request with user 104, and vice versa. In various embodiments, the contact information may have identifying information for a payment account with payment provider server 150 of each contact. In other embodiments, contact information may include financial information (e.g., a financial account, payment card, etc.) corresponding to user 104 to enable user 102 to identify a financial account with a financial provider, such as a bank, used for monetary transfers, and vice versa.

Contact list application 120/140 may receive contact information and/or payment account/financial information through user input using an input device of user device 110/130. In other embodiments, contact list application 120/140 may receive contact information from one or more third party sources, such as an online social networking service of address book, an email service, a messaging service, or other available service to user 102/104. Contact list application 120/140 may also correspond to an application having a contact list, such as a social networking application, an email application, a messaging application (e.g., SMS/MMS messaging, instant messaging, or other messaging service application), a media content sharing application, or other application that may store contacts to allow user 102/104 to communicate, interface, or otherwise correspond with other users. Thus, contact list application 120/140 may utilize communication module 118/138 scrape online sources and/or other user device applications to receive contact information. Contact list application 120/140 may also receive contact information from incoming data received by communication module 118/138. In various embodiments, contact list application 120/140 may verify the accuracy with receive contact information with user 102/104, respectively.

In addition to displaying contact information (e.g., a contact list or individual user contact information) in an application interface, contact list application 120/140 may also display information from transfer module 112/132. Information from transfer module 112/132 may include verification statuses for contacts in contact list application 120/140, credit history/ratings for contacts in contact list application 120/140, and/or other information that transfer module 112/132 may determine and utilize in the application interface of contact list application 120/140, as will be explained in more detail herein. Moreover, contact list application 120/140 may include processes that may be executed with transfer module 112/132 to allow user 102/104 to select a contact in contact list application 120/140 using an input device of user device 110/130, display a transfer request form using an output display device of user device 110/130 having a display module, and initiate and communicate/transmit a transfer request using communication modules 118/138, as explained below with respect to transfer module 112/132.

Thus, transfer module 112/132 may correspond to one or more processes to execute modules of user device 110 to provide a convenient interface in contact list application 120/140 to permit user 102/104 to select a user and request a transfer of a monetary amount with the user. In this regard, transfer module 112/132 may execute one or more modules, such as a monetary transfer module (e.g., a ticket ordering module) of user device 110/130 utilized to present monetary transfer options in an application interface of contact list application 120/140. Transfer module 112/132 may utilize specialized hardware and/or software of user device 110/130 in order to provide the aforementioned monetary transfer services. Therefore, transfer module 112/132 may provide an option to initiate a monetary transfer request in contact list application 120/140. Thus, transfer module 112/132 may interface with an API of contact list application 120/140 to provide the option. The option may appear as a notification, alert, icon, badge, or other signifier displayable to user 102/104 on an output display device of user device 110/130 when the user is viewing an application interface for contact list application 120/140. Transfer module 112/132 may therefore determine whether contact information for each contact in a contact list of contact list application 120/140 is sufficient to initiate transfer requests with the contact. Transfer module 112/132 may utilize the contact information to find a payment account with payment provider server 150 or another financial account, if such information is not already provided in the contact information. If information necessary to initiate a transfer request is not present in the contact information, transfer module 112/132 may not provide a signifier or option to transfer with the associated contact in the contact list, or may utilize the available contact information to transmit the transfer request to the contact for further processing by the contact.

Once transfer module 112/132 has provided an option to initiate a transfer with a contact in a contact list of contact list application 120/140, transfer module may provide for a transfer request form that may be completed by user 102/104 to initiate the transfer. The transfer request form may include a "To" field, a "From" field, a transfer amount, whether the transfer is sending or receiving value, a message, and a commit/send button. The transfer request may populate in the application interface of contact list application 120/140 when user 102/104 selects to initiate a monetary transfer with one of their contacts in the contact list. Thus, once the option to initiate the transfer request is selected with a contact by user 102/104 using an input device of user device 110/130, transfer module 112/132 may cause to be displayed the transfer request form. User 102/104 may then utilize an input device of user device 110/130 to input information into each field. Transfer module 112/132 may auto-populate the "From" field with an identifier for user 102/104 stored to user device 110/130, such as a name, device identifier, and/or payment account identifier/information. The payment account information may be stored by transfer module 112/132 with user device 110/120, for example in database 116/136. Thus, transfer module 112/132 may access database 116/136 to retrieve the payment account information and enter it in the "From" field. Transfer module 112/132 may also populate the "To" field with contact information for the contact in the contact list. Once user 102/104 has entered a transfer amount (and a message when applicable or desired), transfer module 112/132 may initiate the transfer request by communicating the transfer request to the contact and/or payment provider server 150. Transfer module 112/132 may also cause a digital wallet to be displayed by user device 110/130, where user 102/104 may select a payment instrument for use in the transfers and/or manage previous transactions.

For example, if user 102 wishes to initiate a transfer with user 104, user 102 may have selected user 102 in contact list application 120, completed the transfer request form, and cause transfer module 112 to utilize module of user device 110 to communicate the transfer request to user device 130 and/or payment provider server 150. The transfer request may be transmitted to user device 130 directly, using short range wireless communications such as Bluetooth Low Energy, LTE Direct, radio frequency, infrared, Bluetooth, and near field communications. In other embodiments, the transfer request may be communicated over network 160 to user device 130. Still further, the transfer request may be communicated to payment provider server 150 for retrieval by user device 130 when user device 130 accesses user 104's payment account with payment provider server 150.

As previously discussed, transfer module 112/132 may also determine verification statuses for contacts in a contact list of contact list application 120/140 and/or credit ratings/histories for the contacts in the contact list of contact list application 120/140. Transfer module 112/132 may utilize the contact information for the contact with communication module 118/138 to determine the verification status and/or credit history for the contact. Transfer module 112/132 may request and/or receive the verification status from payment provider server 150. Additionally, transfer module 112/132 may request the credit history from payment provider server 150, a financial institution, and/or credit bureau. Additionally, transfer module 112/132 may keep a history of transactions/transfers with the contact and present the history to user 102/104 in the application interface of contact list application 120/140 and/or utilize the history to further determine the credit history for the contact. Transfer module 112/132 may present the verification status/credit history in the application interface of contact list application 120/140, for example as an icon, displayable information, or other signifier.

Transfer module 112/132 may utilize a communication protocol, service, or process utilized by contact list application 120/140 or other communication application of user device 110/130 to communicate the transfer request. For example, transfer module 112/132 may cause an email to be transmitted having the transfer request, a text message with the transfer request, or a social networking message having the transfer request. Thus, transfer module 112/132 may interface with the communication service of contact list application 120/140 to transmit the transfer request. In other embodiments, transfer module 112/132 may transmit the transfer request alone using communication module 118/138, for example, as a separate data message.

User device 110/120 includes other applications 114/134 as may be desired in particular embodiments to provide features to user device 110/120. For example, other applications 114/134 may include security applications for implementing client-side security features, programmatic client applications for interfacing with appropriate application programming interfaces (APIs) over network 160, or other types of applications. Other applications 114/134 may also include email, texting, voice and IM applications that allow a user to send and receive emails, calls, texts, and other notifications through network 160. In various embodiments, other applications 114/134 may include financial applications, such as banking, online payments, money transfer, or other applications associated with payment provider server 150. Other applications 114/134 may include browser applications enabling user device 110/120 to access websites and/or receive information from one or more online sources. Additionally, other applications 114/134 may include social networking/media application, including microblogging applications. Other applications 114/134 may contain other software programs, executable by a processor, including a graphical user interface (GUI) configured to provide an interface to the user.

User device 110/120 may further include database 114/124 which may include, for example, identifiers such as operating system registry entries, cookies associated with contact list application 120/140, transfer module 112/132 and/or other applications 114/134, identifiers associated with hardware of user device 110/120, or other appropriate identifiers, such as identifiers used for payment/user/device authentication or identification. In one embodiment, identifiers in database 114/124 may be used by a merchant device and/or payment provider, such as payment provider server 150, to associate user device 110 with a particular account maintained by the payment/credit provider.

In various embodiments, database 116/136 may further include user information data to access user accounts, such as payment account information for a payment account with payment provider server 150. Thus, database 116/136 may include user personal information (e.g. a name, social security number, user financial information, or other identifying information), a user account identifier, and a user device identifier. In various embodiments, database 116/136 may include online account access information. Database 116/136 may also store contact list information and/or monetary transfer information, including transaction histories of monetary transfers. Database 116/136 may include transaction histories stored for later use.

In various embodiments, user device 110/120 includes at least one communication module 118/138 adapted to communicate with user device 110/120 and/or payment provider server 150 over network 160 and/or directly. Thus, communication module 115/125 may include a DSL (e.g., Digital Subscriber Line) modem, a PSTN (Public Switched Telephone Network) modem, an Ethernet device, a broadband device, a satellite device and/or various other types of direct wired and/or wireless network communication devices including microwave, radio frequency, infrared, Bluetooth, and near field communication components. Communication module 118/138 may communicate directly with another nearby device using short range communications, such as Bluetooth Low Energy, LTE Direct, radio frequency, infrared, Bluetooth, and near field communications. Thus, communication module 118/138 may include various specialized short range communication modules that may connect with nearby devices.

Payment provider server 150 may be maintained, for example, by an online payment service provider, which may provide payment service to a user. In this regard, payment provider server 150 includes one or more processing applications, which may provide transfers between communication devices, such as user device 110 and user device 130. In one example, payment provider server 150 may be provided by PAYPAL®, Inc. of San Jose, Calif., USA. However, in other embodiments, payment provider server 150 may be maintained by or include a merchant, financial services provider, and/or other service provider, which may provide transfer services to user 102/104. Payment provider server 150 may additionally provide use of payment accounts for use in transferring monetary values.

Payment provider server 150 of FIG. 1 includes a transaction processing application 152, other applications 154, a database 156, and a network interface component 158. Transaction processing application 152 and other applications 154 may correspond to processes, procedures, and/or applications executable by a hardware processor, for example, a software program. In other embodiments, payment provider server 150 may include additional or different software as required.

Transaction processing application 152 may execute one or more modules of payment provider server to receive and/or transmit information between user device 110 and user device 130 for processing and completion of transfer requests for user 102 and user 104. In this regard, transaction processing application 152 may be configured to receive and/or transmit information between user device 110 and user device 130 for processing and completion of monetary transfers. For example, transaction processing application 152 may include one or more applications to process a request for a transfer for a monetary amount from user 102 to user 104. Transaction processing application 152 may receive a request for a transfer of a monetary amount from user device 110 and corresponding to user device 130. The request may include contact information corresponding to user 104. Transaction processing application 152 may complete the request for the transfer of the monetary amount using the contact information. The request may correspond to sending the monetary amount to user 104; therefore transaction processing application 152 may credit and post the monetary amount to a user account and/or financial account of user 104. In other embodiments, the request may correspond to a request to receive the monetary amount form user 104. In such embodiments, transaction processing application 152 may post the request to a user account and/or financial account of user 104 for approval. Additionally, transaction processing application 152 may transmit a notification to user 104 of the request, including the terms for the request (e.g. monetary amount and transmission/due date) and/or messages included with the request. Transaction processing application 152 may provide transaction histories, including receipts, for use by user device 110 and/or user device 130 to complete or retain a history of the transfers.

In various embodiments, payment provider server 150 includes other applications 154 as may be desired in particular embodiments to provide features to payment provider server 150. For example, other applications 154 may include security applications for implementing server-side security features, programmatic server applications for interfacing with appropriate application programming interfaces (APIs) over network 160, or other types of applications. Other applications 154 may contain software programs, executable by a processor, including a graphical user interface (GUI), configured to provide an interface to a user.

Additionally, payment provider server 150 includes database 156. As previously discussed, user 102 may establish one or more user accounts with payment provider server 150. User accounts in database 156 may include user information, such as name, address, birthdate, payment/funding information, additional user financial information, and/or other desired user data. User 102/104 may link user accounts to user device 110/120 through a user device identifier. Thus, when a device identifier corresponding to user device 110 is transmitted to payment provider server 150, e.g. from user device 110/120; a user account belonging to user 102/104 may be found. Database 156 may further store requests for monetary transfers corresponding to user 102/104 and/or transaction history for completed monetary transfers.

In various embodiments, payment provider server 150 includes at least one communication module (NIC) 134 adapted to communicate with network 160 including user device 110 and/or user device 130. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
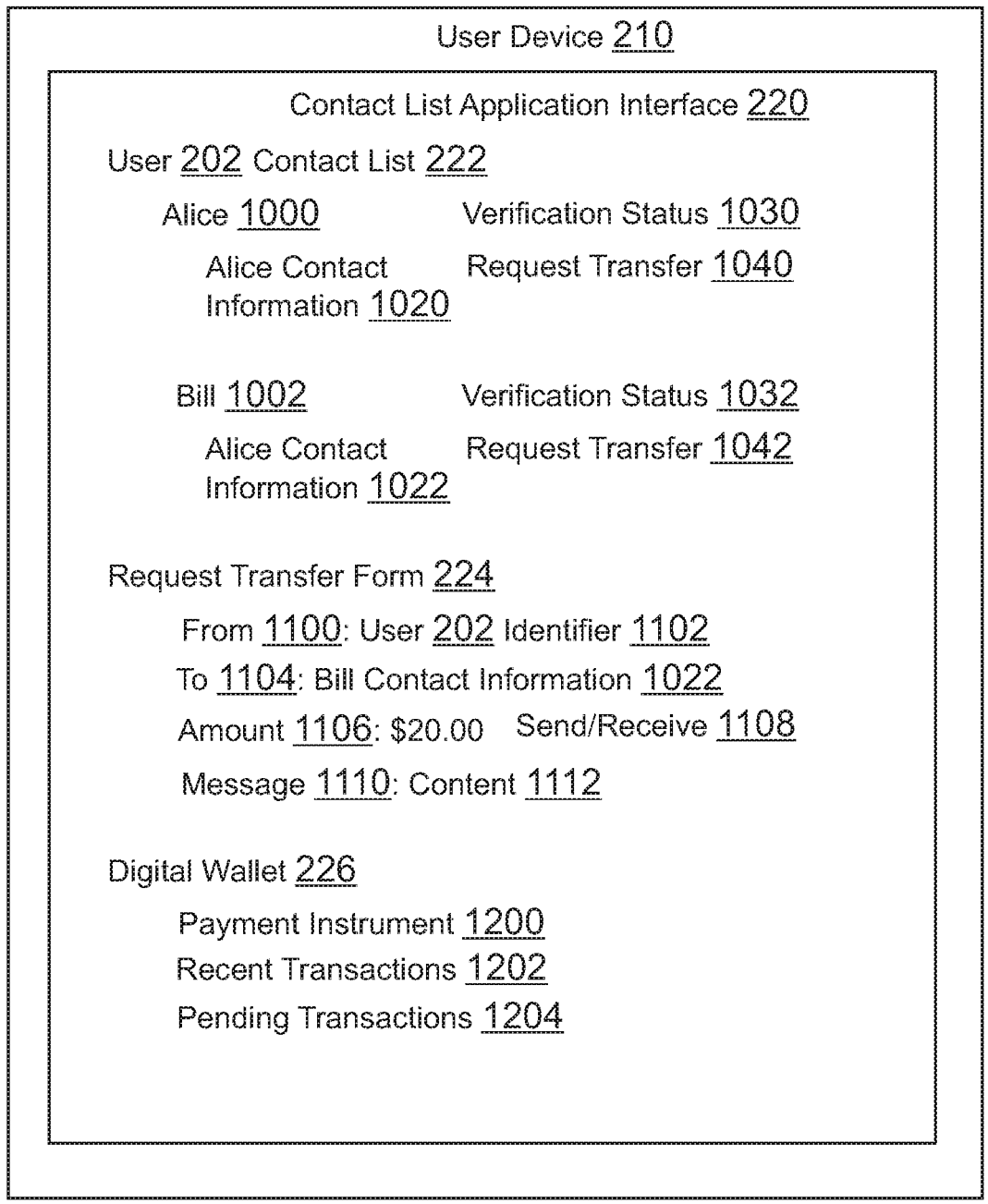
FIG. 2 is an exemplary user device interface having a displayable contact list utilized by a transfer module to provide transfers with users in the contact list, according to an embodiment.

FIG. 2 is an exemplary user device interface having a displayable contact list utilized by a transfer module to provide transfers with users in the contact list, according to an embodiment. FIG. 2 includes a user device 210 corresponding generally to user device 110 of FIG. 1. Moreover user device 210 executes a contact list application, corresponding generally to the executable modules and processes described in reference to contact list application 120 of FIG. 1, in order to display a contact list application interface 220 on an output device of user device 210 having a display module.

As previously discussed, a transfer module of user device 210 may be executed in order to provide monetary transfer services through contact list application interface 220 to a user of user device 210 (e.g., a user 202, not shown). In this regard, contact list application interface 220 causes a user 202 contact list 222, a request transfer form 224, and a digital wallet 226 to be displayed to user 202 of user device 210. User contact list 222 includes contacts of user 202, such as Alice 1000 and Bill 1002. Under each listing is contact information for each user, a verification status, and a request transfer option. Thus, under Alice 1000 is Alice contact information 1020 (e.g., a phone number, email address, messenger identification, etc.), a verification status 1030 (e.g., whether Alice is verified with a payment provider enabling the payment provider to authenticate the identity of payment account of Alice), and a request transfer 1040 option. As previously discussed, Alice contact information 1020 may further include payment account information, financial information, and/or another payment instrument that may be utilized to process a transfer with user 202. Similarly, Bill 1002 includes Bill contact information 1022, verification status 1032, and request transfer 1042 option.

Selection of one of request transfer 1040 option and request transfer 1042 option causes contact list application interface 220 to display request transfer form 224. Request transfer form 222 includes a "From" 1100 field, a "To" 1104 field, an "Amount" 1106 field, a send/receive 1108 selection, and a message 1110. "From" 1100 field corresponds to a field where user 202 may enter their identifier in order to inform the receiver of the transfer request in request transfer form 224 to identify user 202 as originating the request, and may be auto-populated by the transfer module or selected by user 202. Thus, "From" 1100 field includes user 202 identifier 1102. User 202 identifier 1102 may also include payment account information or other information enabling a receiving entity to locate and identify a payment account for user 202 used in the transfer request. "To" 1104 field includes information of the party with which the request to transfer a monetary amount is to be conducted with. "To" 1104 field may auto-populate by the transfer module when selecting one of request transfer 1040 and request transfer 1042. Thus, "To" 1104 field includes Bill contact information 1022 after selection of request transfer 1042. Amount 1106 field may be entered by user 202 and include an amount for the transfer request. As previously discussed, the amount may be an amount to send or receive by user 202. User 202 may specify whether the amount is to be sent or received in "Amount" 1106 field (e.g., a positive or negative amount) or using send/receive 1108 selection. Further, user 202 may utilize message 1110 in order to communicate with the receiver of the transfer request. Thus, message 1110 includes content 1112.

Finally, the transfer module may enable user 202 to view digital wallet 226 in contact list application interface 220 or through another display interface of user device 210. Digital wallet 226 includes a payment instrument 1200, recent transactions 1202, and pending transactions 1204. Payment instrument 1200 may include a payment instrument to be utilized with transfer requests, including a payment account, a financial account, and/or a payment card. Recent transactions 1202 include transactions stored to digital wallet 226 that have been processed so that user 202 may review an account history. Further pending transactions 1204 include transactions that have been sent but have yet to be processed so that user 202 may view current expenditures and incoming transfers.

Figure 3:
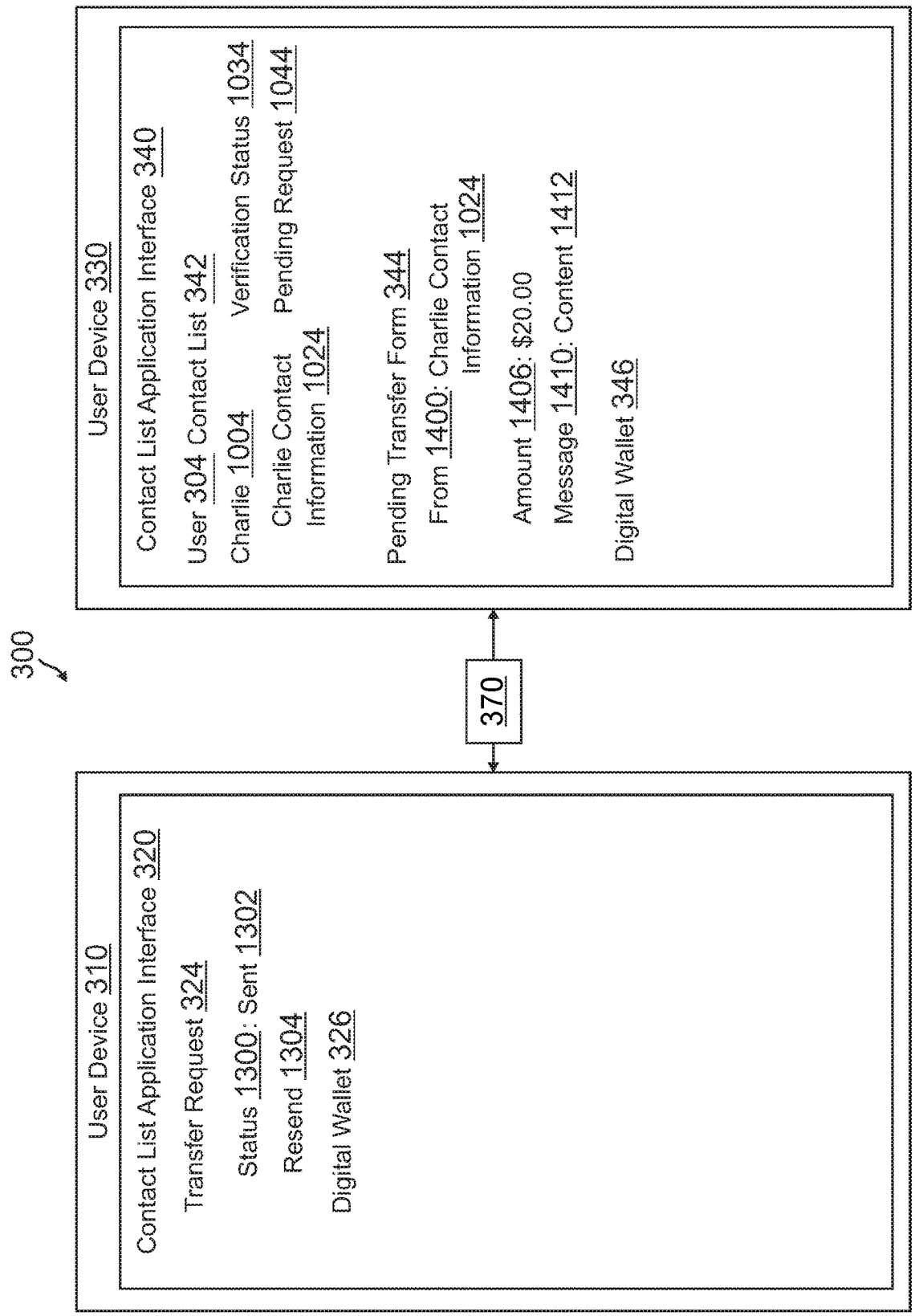
FIG. 3 is an exemplary environment having two user device interfaces utilizing a transfer module with a displayable contact list to display a transmitted transfer request, according to an embodiment.

FIG. 3 is an exemplary environment having two user device interfaces utilizing a transfer module with a displayable contact list to display a transmitted transfer request, according to an embodiment. Environment 300 includes a user device 310 and a user device 330 corresponding generally to user device 110 and user device 130, respectively, of FIG. 1. Moreover, user device 310 and 330 execute a contact list application, corresponding generally to the executable modules and processes described in reference to contact list application 120 and contact list application 140, respectively, of FIG. 1, in order to display a contact list application interface 320 and a contact list application interface 340 on an output device of user device 310 and 330, respectively, having a display module.

Contact list application interface 320 displays an interface after communicating a transfer request to user device 330 for processing (e.g., after completing transfer request form 224 of FIG. 2). Thus, contact list application interface 320 includes a transfer request 324 corresponding to a transmitted transfer request form and includes a status 1300 and a resend 1304 option. Statues 1300 display a sent 1302 status and may be changed to other statuses, such as unsent, completed, denied, and/or error. The user of user device 310 may also utilize digital wallet 326 to view the user's digital wallet, as discussed in reference to digital wallet 226 of FIG. 2.

User device 310 communicates transfer request 324 to user device 330 over communication medium 370. Communication medium 370 may correspond to short range wireless communications between user device 310 and user device 330. In other embodiments, communication medium 370 may correspond to a network, such as network 160 of FIG. 1. Further communication medium 370 may also correspond to a payment provider server that receives transfer request 324 and then communicates the transfer request to user device 330.

Once the transfer request is received by user device 330, contact list application interface 340 may display information to a user of user device 330 (e.g., a user 304, not shown) enabling the user to complete the transfer request. Thus, contact list application interface 340 includes a user 304 contact list 342, a pending transfer form 344, and a digital wallet 346. User 304 contact list 342 includes contacts of user 304, such as Charlie 1004 (e.g., the user for user device 310 transmitting the transfer request). Under each listing is contact information for each user, a verification status, and a request transfer option or alert. Thus, under Charlie 1004 is Charlie contact information 1024 (e.g., a phone number, email address, messenger identification, etc.), a verification status 1034 (e.g., whether Charlie is verified with a payment provider enabling the payment provider to authenticate the identity of payment account of Charlie), and a pending request 1044 alert. As previously discussed, Charlie contact information 1024 may further include payment account information, financial information, and/or another payment instrument that may be utilized to process a transfer with user 304.

Pending transfer form 344 may auto-populate or may display after selection of pending request 1044. Pending transfer form 344 includes a "From" 1400 field displaying Charlie contact information 1024 allowing user 304 to determine who the transfer request is from, an amount 1406 field for an amount of the transfer request (including whether the monetary amount in the transfer request is incoming or outgoing), and message 1410 having content 1412 that may be sent with the transfer request (e.g., identifying that the transfer request is meant to cover or pay for). Finally, contact list application interface 340 includes a digital wallet 346 similar to digital wallet 226 of FIG. 2 that user 304 may utilize to view payment instruments and past/pending transactions.

Figure 4:
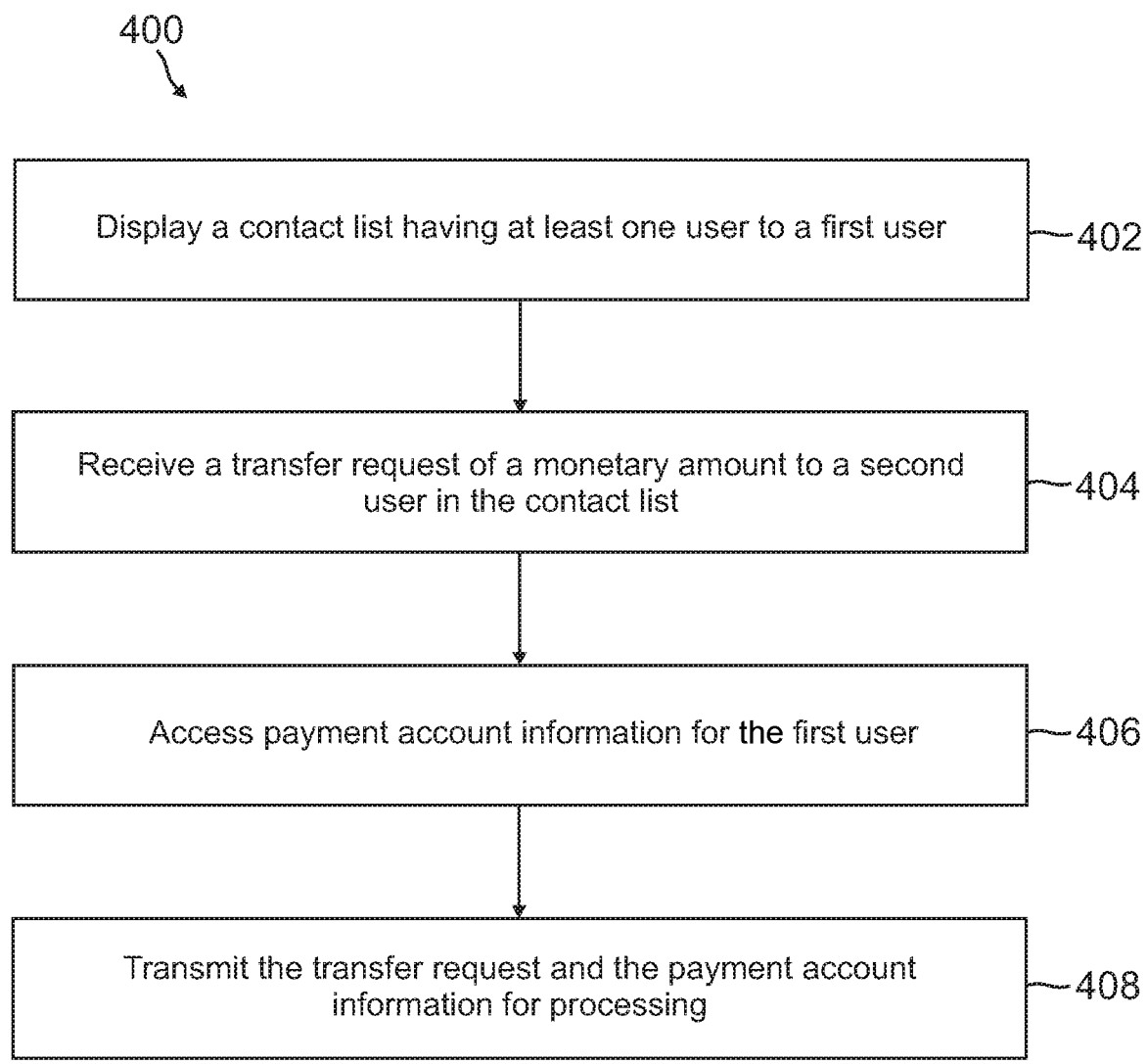
FIG. 4 is a flowchart of an exemplary process for displaying a communication device interface for monetary transfers through a displayable contact list, according to an embodiment.

FIG. 4 is a flowchart of an exemplary process for displaying a communication device interface for monetary transfers through a displayable contact list, according to an embodiment. Note that one or more steps, processes, and methods described herein may be omitted, performed in a different sequence, or combined as desired or appropriate.

At step 402, a contact list having at least one user is displayed to a first user. The contact list may be displayed to the first user on an output device of a communication device comprising a display module that may communicate the contact list and/or contact information to the first user. An input/output interface may be in communication with the output device and an input device. Thus, at step 404, a transfer request of a monetary amount to a second user in the contact list may be received. For example, the first user may utilize the input device to select the second user or the second user's contact information in the contact list while viewing the contact list on the display module.

The contact list/information may be accessed from a non-transitory memory of the communication device. For example, a contact list application may include the contact list/information, such as one of an email contact list, a phone number contact list, a text message contact list, an instant messaging contact list, a social networking contact list, and a media sharing contact list. Thus, the contact information may be received by a communication module of the communication device from a social networking service. In such embodiments, a social networking application associated with the social networking service utilizes the communication module to access the contact information from the social networking service in order to receive the contact information by the communication module. In other embodiments, the contact information may be entered by the first user.

When selecting the second user in the contact list, the second user's contact information may be displayed or accessed from the non-transitory memory. The second user's contact information may include at least one of a second user payment account with the payment provider, a second user financial account, and second user personal information.

At step 406, payment account information for the first user is accessed. The payment account information may comprise a verification status of the first user with a payment provider associated with the payment account information. Additionally, a verification status for each of the plurality of users with the payment provider may be accessed from the non-transitory memory. The verification status for each of the plurality of users may be displayed to the first user in the contact list. The verification status may be received from the payment provider. Additionally, a credit report for the second user may be received from at least one of a payment provider, a financial institution, and a credit bureau and may also be displayed to the first user, either when selecting the second user or in the contact list/information. Payment accounts may also comprise a financial account with a financial institution.

Additionally, the display module may display a transmittable message to the first user on selection of the second user from user interface of the contact list application by the first user, wherein the transmittable message comprises the transfer request and the payment account information. The transmittable message may also comprise an identifier for the payment account of the first user that the payment provider uses to execute a transaction processing module to uniquely identify the first user's payment account and verify the first user is requesting the transfer. The first user may also utilize the input device to input message content for the transmittable message. Additionally, the transmittable message may be communicated to one of the second user and the payment provider for processing the transfer between the first user and the second user, at step 408.

Figure 5:
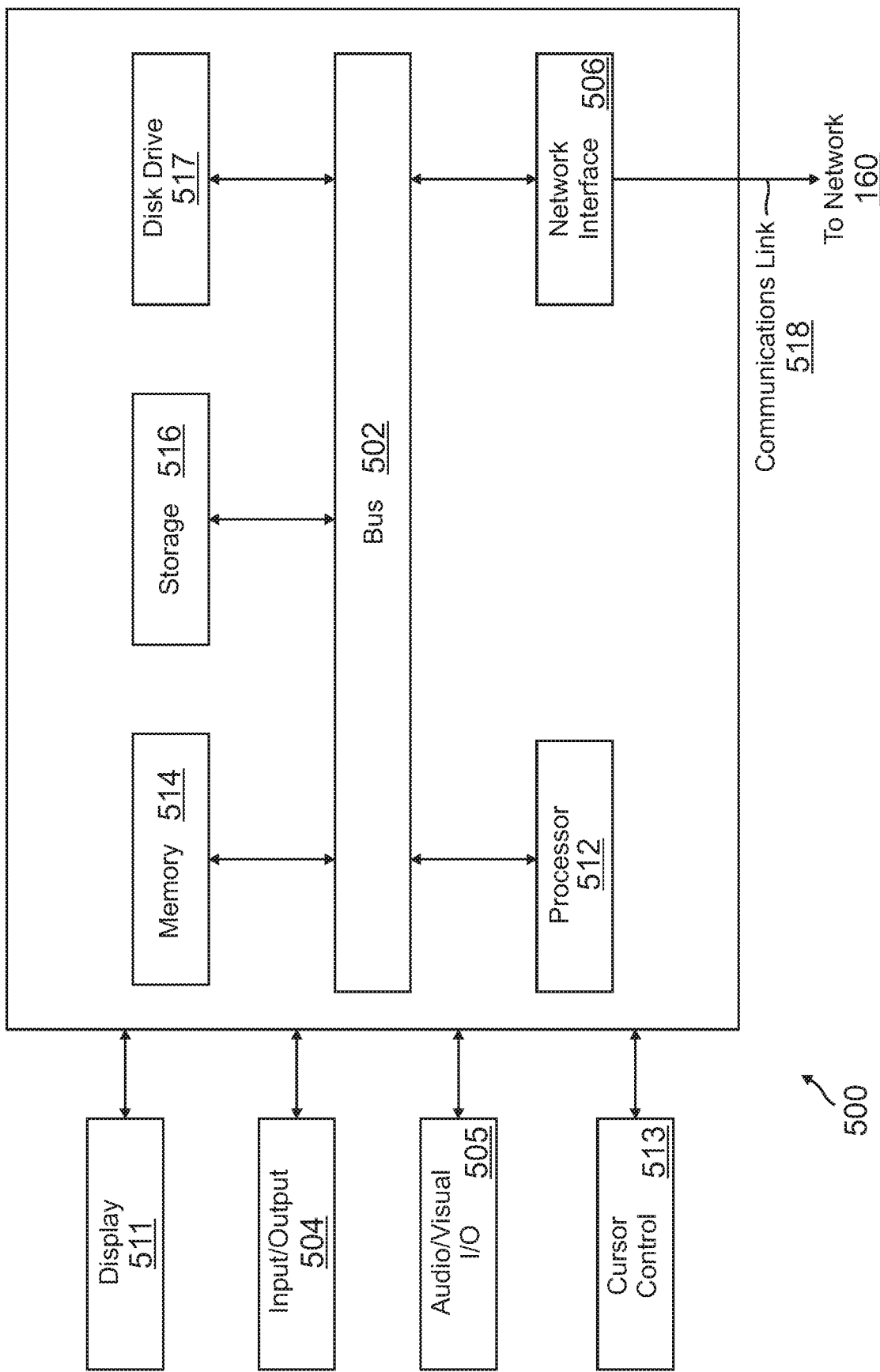
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, PDA, Bluetooth device, key FOB, badge, etc.) capable of communicating with the network. The merchant device and/or service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, a merchant device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A non-transitory machine-readable medium having instructions stored thereon, the instructions executable to cause performance of operations comprising:
    accessing, by a transfer application executing on a user device of a first user, contact information of a contact application of the user device, wherein the contact information is accessed from an application programming interface (API) of the contact application;
    determining, by the transfer application using an identifier for a second user from the contact information, that the second user has a second user account with a transaction processor service, the transaction processor service associated with the transfer application;
    causing to be displayed, a selectable icon for an option in a contact list interface of the contact application, the option for initiating a transfer from a first user account of the first user to the second user account using the transfer application, the selectable icon displayed with a second user contact information for the second user in the contact list interface, the selectable icon identifying the second user as using the transaction processor service for transfers using the second user account, the selectable icon further indicating a first verification status of the second user account;
    in response to receiving selection of the icon by the first user, populating a transfer interface in the contact application with the second user contact information; and
    in response to receiving a request to process the transfer, communicating a transfer request, to a second user device of the second user for performing the transfer using the transaction processor service.

2. The non-transitory machine-readable medium of claim 1, wherein the operations further comprise receiving an input from the first user, by the transfer application, indicating a request to view the contact list interface for the contact application, wherein the contact list interface comprising the contact information is displayed within a graphical user interface (GUI) for the user device.

3. The non-transitory machine-readable medium of claim 1, wherein said displaying the selectable icon comprises displaying, by the transfer application through the API, a first icon corresponding to the second user account, wherein the first icon identifies the second user as using the transaction processor service.

4. The non-transitory machine-readable medium of claim 3, wherein the first verification status is determined by the transaction processor service based on a past transaction history of the second user with the transaction processor service and indicates that the second user account has been authenticated with the transaction processor service.

5. The non-transitory machine-readable medium of claim 1, wherein the operations further comprise receiving an input for a payment transfer from the first user via the transfer request.

6. The non-transitory machine-readable medium of claim 1, wherein the contact information comprises an account identifier for the first user that uniquely identifies the first user and verifies that the first user is requesting the transfer.

7. The non-transitory machine-readable medium of claim 1, wherein the contact information is received through a social networking application associated with a social networking service.

8. The non-transitory machine-readable medium of claim 1, wherein the contact list interface comprising the contact information is displayed within a graphical user interface (GUI) for the user device.

9. A method for initiating transactions from contact lists, the method comprising:
    accessing, by a transfer module of a contact application executing on a user device of a first user, contact information of via an application programming interface (API) of the contact application;
    determining, by the transfer module using an identifier of a second user based on the contact information, that the second user has a second user account with a transaction processor service, the transaction processor service accessible via the transfer module;
    displaying a selectable icon for an option in a contact list interface of the contact application, the option for initiating a transfer from a first user account of the first user to the second user account using the transfer module, the selectable icon displayed with a second user contact information for the second user in the contact list interface, the selectable icon identifying the second user as using the transaction processor for transfers using the second user account, the selectable icon further indicating a first verification status of the second user account;
    in response to receiving selection of the icon by the first user, generating a transfer request in the contact application indicating a request for transfer from the second user account; and
    in response to receiving a request to process the transfer, communicating the transfer request to a second user device of the second user for performing the transfer using the transaction processor service.

10. The method of claim 9, further comprising receiving, by the transfer module from the first user, a request to view the contact list interface for the contact application, wherein the contact list interface comprising the contact information is displayed within a graphical user interface (GUI) for the user device.

11. The method of claim 9, further comprising displaying, by the transfer module in the contact list interface for the contact application through the API, a first icon corresponding to the second user account, wherein the first icon identifies the second user as a user of the transaction processor.

12. The method of claim 11, wherein the first verification status is determined by the transaction processor based on a past transaction history of the second user with the transaction processor and indicates that the second user account has been authenticated with the transaction processor.

13. The method of claim 9, further comprising receiving an input for the transfer from the first user via the transfer request within the contact application.

14. The method of claim 9, wherein the contact information comprises an account identifier for the first user that uniquely identifies the first user and verifies that the first user is requesting the transfer.

15. A user device comprising:
   a non-transitory memory storing instructions; and
   a processor configured to execute the instructions to cause the user device to:
      access, by a transfer module of a contact application executing on the user device of a first user, contact information using an application programming interface (API) of the contact application;
      determine, by the transfer module using an identifier of a second user obtained from the contact information, that a second user has a second user payment account with a transaction processor service, the transaction processor service associated with the transfer module;
      causing to display, a selectable icon for an option in a contact list interface of the contact application, the option for initiating a transfer from a first account of the first user to a second account of the second user using the transfer module, the option displayed with a second user contact information for the second user in the contact list interface, the option identifying the second user as using the transaction processor service for transfers using the second user payment account, the selectable icon further indicating a first verification status of the second user payment account;
      in response to receiving a selection of the icon by the first user, populate a transfer interface in the transfer module with the second user contact information; and
      in response to receiving a request to process the transfer, communicate a transfer form to a second user device of the second user to use the transaction processor service for processing the transfer.

16. The user device of claim 15, wherein executing the instructions further causes the user device to receive, by the transfer module from the first user, a request to view the contact list interface for the contact application, wherein the contact list interface comprising the contact information is displayed within a graphical user interface (GUI) for the user device.

17. The user device of claim 15, wherein executing the instructions further causes the user device to display, by the transfer module in the contact list interface for the contact application through the API, a first icon corresponding to the second user payment account, wherein the first icon identifies the second user as a user of the transaction processor service.

18. The user device of claim 17, wherein the first verification status is determined by the transaction processor based on a past transaction history of the second user with the transaction processor service and indicates that the second user payment account has been authenticated with the transaction processor.

19. The user device of claim 15, wherein executing the instructions further causes the user device to receive an input for the transfer from the first user via the transfer interface within the contact application.

* * * * *